United States Patent [19]

Kawahara et al.

[11] Patent Number: 5,859,907
[45] Date of Patent: Jan. 12, 1999

[54] ECHO CANCELER AND ECHO PATH ESTIMATING METHOD

[75] Inventors: Toshiro Kawahara, Yokosuka; Toshio Miki, Yokohama; Hirohito Suda; Tomoyuki Ohya, both of Yokosuka; Hirofumi Takagi, Yokohama, all of Japan

[73] Assignee: NTT Mobile Communications Network, Inc.

[21] Appl. No.: 507,507

[22] PCT Filed: May 2, 1995

[86] PCT No.: PCT/JP95/00866

§ 371 Date: Jan. 16, 1996

§ 102(e) Date: Jan. 16, 1996

[87] PCT Pub. No.: WO95/31052

PCT Pub. Date: Nov. 16, 1995

[30] Foreign Application Priority Data

May 6, 1994 [JP] Japan ................................ 94 117640
May 7, 1994 [JP] Japan ................................ 94 117589

[51] Int. Cl.6 .................................................... H04M 1/00
[52] U.S. Cl. ......................... 379/410; 379/406; 379/411
[58] Field of Search .................................. 379/410, 411, 379/407, 406, 402, 3, 6, 408; 381/73.1, 94.2; 364/724.19; 370/290, 286

[56] References Cited

U.S. PATENT DOCUMENTS

| | | | |
|---|---|---|---|
| 4,562,312 | 12/1985 | Duttweiler | 370/290 |
| 4,571,720 | 2/1986 | Chevreau et al. | 379/411 |
| 4,582,963 | 4/1986 | Danstrom | 379/411 |
| 4,621,173 | 11/1986 | Guidoux | 379/411 |
| 5,131,032 | 7/1992 | Esaki et al. | 379/410 |
| 5,151,937 | 9/1992 | Chujo et al. | 379/410 |
| 5,305,309 | 4/1994 | Chujo et al. | 379/411 |
| 5,327,496 | 7/1994 | Russell et al. | 381/73.1 |
| 5,604,799 | 2/1997 | Komoda et al. | 379/410 |
| 5,696,819 | 12/1997 | Suizu et al. | 379/410 |

FOREIGN PATENT DOCUMENTS

| | | |
|---|---|---|
| 0 391 715 A2 | 10/1990 | European Pat. Off. . |
| 0 467 163 A1 | 1/1992 | European Pat. Off. . |
| 0 498 369 A2 | 12/1992 | European Pat. Off. . |
| 62-116025 | 5/1987 | Japan . |
| 4-65922 (A) | 2/1992 | Japan . |
| 58 090832 | 8/1993 | Japan . |

OTHER PUBLICATIONS

Patent Abstracts of Japan, vol. 11, No. 212, E–522.
Patent Abstracts of Japan, vol. 11, No. 11, E–470.
Patent Abstracts of Japan, vol. 11, No. 306, E–546.

*Primary Examiner*—Ahmad F. Matar
*Assistant Examiner*—Jacques M. Saint-Surin
*Attorney, Agent, or Firm*—John T. Johnson; Rogers & Wells LLP

[57] ABSTRACT

The present invention relates to an echo canceler for training an echo path estimation without providing a hindrance to a speech. The echo canceler of the present invention includes a pseudo noise generator for generating a certain pseudo noise. This pseudo noise is forcibly supplied to a transmission line for transmitting a far-end talker's voice. Here, in the case where the far-end talker's transmitting speech level is faint or the far-end talker is in a speechless condition, a certain correlation is established between the pseudo noise and a signal of the transmission line for transmitting the near-end talker's voice. Based on such a correlation as just mentioned, a coefficient for generating an echo replica is calculated. Therefore, a training for estimating an echo path is performed based on the pseudo noise and without depending on the far-end talker's voice, thereby enabling to generate an appropriate echo replica.

14 Claims, 8 Drawing Sheets

SECOND EMBODIMENT

FIRST EMBODIMENT

FIG.4
SECOND EMBODIMENT

FIG.7
FOURTH EMBODIMENT

FIG.8
MODIFICATION OF FOURTH EMBODIMENT

FIG.9 FIFTH EMBODIMENT

FIG.11

ECHO CANCELER AND ECHO PATH ESTIMATING METHOD

TECHNICAL FIELD

This invention relates to an echo canceler suited to be used for a mobile communications network and a long-distance telephone line network. Also, the invention relates to an echo path estimating method suited to be used for this echo canceler.

BACKGROUND ART

In a long-distance telephone line via a submarine cable or via a communication satellite, the subscriber's line, in general, connected to both ends of the line is of a two-wire circuit and its long-distance transmission portion is of a four-wire circuit for the purposes of amplification of a signal, etc. Similarly, in the mobile communications network using a mobile telephone (or cellular phone), the subscriber's line of a terrestrial analog telephone is of a two-wire circuit and its portion from a terminal of the mobile telephone to a switch, etc. is of a four-wire circuit. In this case, the connection region between the two-wire and the four-wire is provided with a hybrid circuit for performing a four-wire/two-wire conversion.

Figure 2:
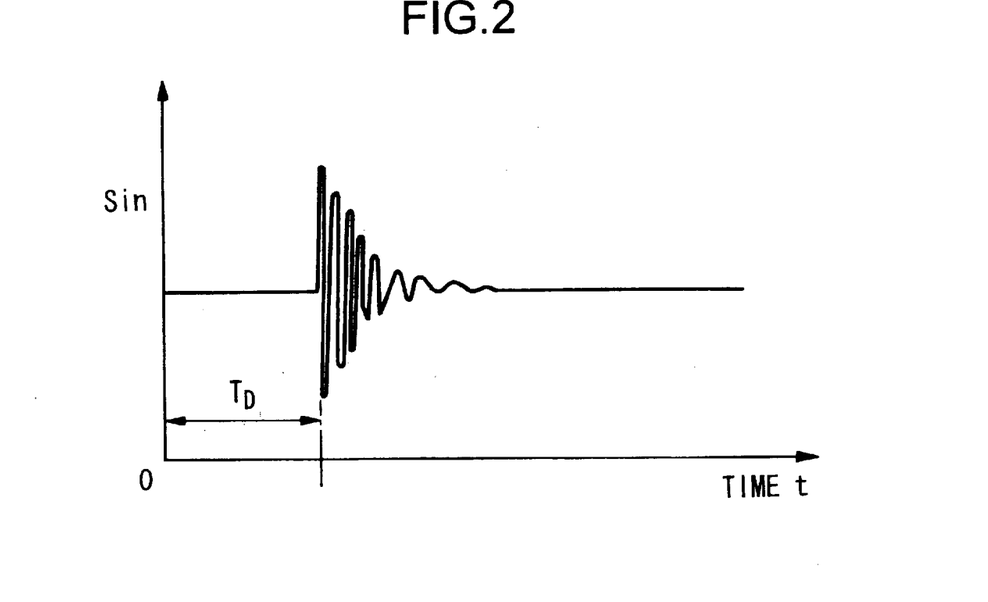
FIG. 2 is a chart showing the waveform of an echo.

This hybrid circuit is designed to match with the impedance of the two-wire circuit. However, since it is difficult to obtain always a good matching condition, a received signal reaching an input side of the four-wire of the hybrid circuit tends to leak toward an output side of the four-wire, thereby generating a so-called echo. Since such an echo is lower in level than the talker's voice and reaches the talker after a delay of a predetermined time period, a speech hindrance is created. Such a speech hindrance caused by echo becomes more significant as the signal propagation time becomes longer. Particularly, in the case of a mobile communication using a mobile telephone, since various processing procedures are carried out in the radio communication section leading to the switch, etc., the delay of signal is increased, thus resulting, particularly, in the problem of speech hindrance caused by echo. FIG. 2 shows one example of the waveform of an echo with respect to impulse response.

Figure 1:
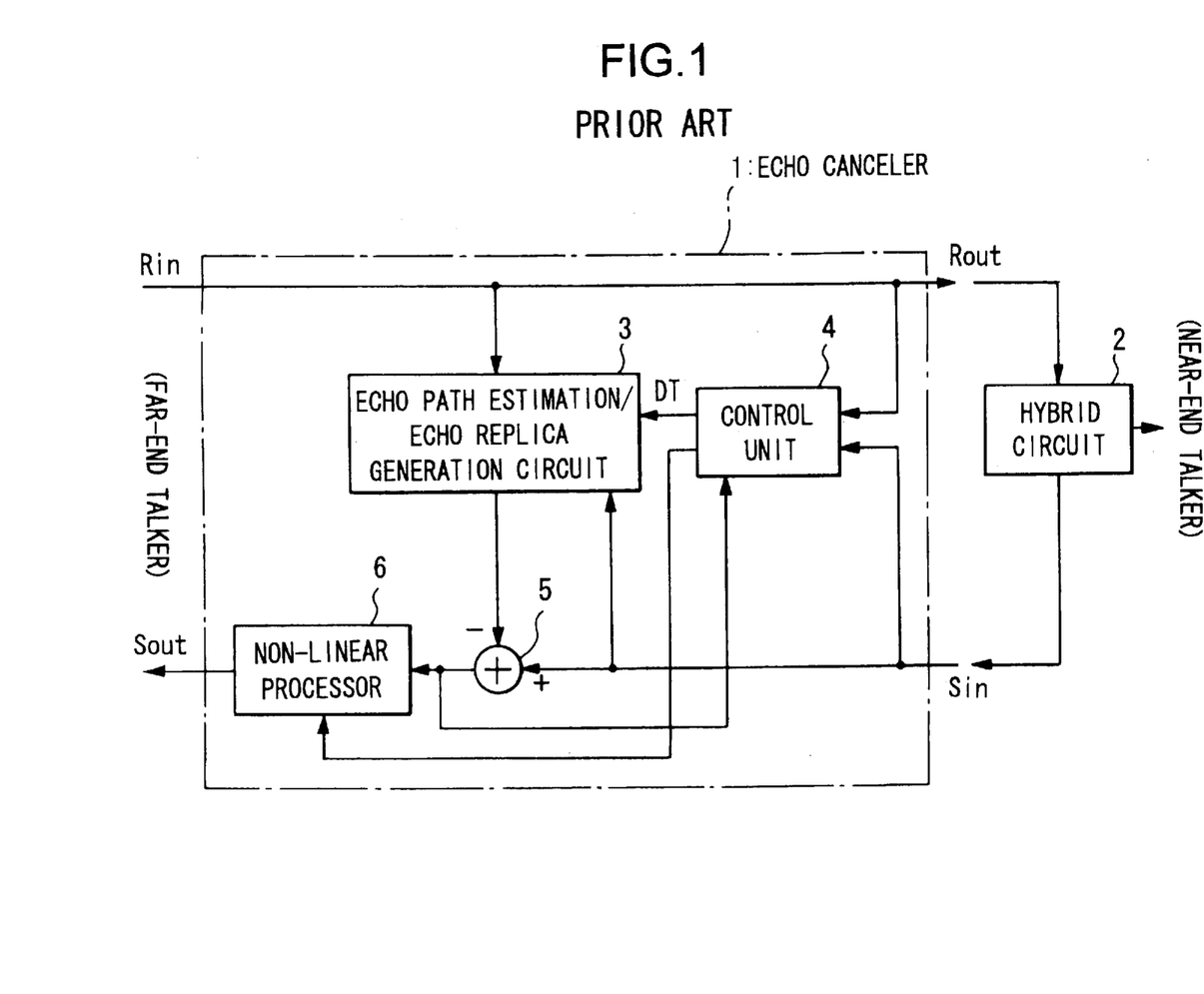
FIG. 1 is a block diagram showing a construction of a conventional echo canceler.

As an apparatus for preventing a generation of echo, there are an echo suppressor and an echo canceler. FIG. 1 shows a schematic construction of an echo canceler which can be used in a mobile communications network. The echo canceler 1 illustrated here is located on a front stage of a hybrid circuit 2. In this illustration, the subscriber of an ordinary analog telephone is referred to as the "near-end talker" and the subscriber of a mobile telephone as the "far-end talker". A far-end voice signal input into the echo canceler 1 is represented by Rin; a far-end voice signal output from the echo canceler 1, by Rout; a near-end voice signal input into the echo canceler 1, by Sin; and a near-end voice signal output from the echo canceler 1, by Sout; respectively.

The echo canceler 1 shown in FIG. 1 comprises an echo path estimation/echo replica generation circuit 3, a control unit 4, an adder 5, and a non-linear processor 6. Here, the echo path estimation/echo replica generation circuit 3 detects a response characteristic of the hybrid circuit 2 based on both the far-end voice input Rin and near-end voice input Sin and estimates an echo path (namely, echo propagating line). Then, an anticipated echo (namely, echo replica) from the hybrid circuit 2 is generated through a convolutional operation based on the result of estimation and the far-end voice input Rin. This echo replica is generated by an FIR filter which is constituted of so many taps as 512, for example. A convolutional operation in an echo replica refers to this. In the adder 5, this echo replica is subtracted from the near-end voice input Sin, thereby canceling the echo. As the above-mentioned echo path estimation algorithm, a learning identification algorithm is used. Among many adaptive algorithms, this learning identification algorithm is comparatively small in computational complexity and good in convergence characteristic.

Specifically, the echo path estimation/echo replica generation circuit 3 has an FIR filter. An echo replica signal Y(z) output from the FIR filter can be obtained by the following equation (1).

$$Y(z) = \left( \sum_{i=0}^{N-1} b_i z^{-i} \right) Rout(z) \qquad (1)$$

In the equation (1), N is the number of taps of the FIR filer, and $b_i$ (where i=0, 1, 2, ... N−1) is a tap coefficient in each tap. If appropriate values of the tap number N and tap coefficient $b_i$ can be obtained by estimation of an echo path, the echo replica signal Y(z) is approximated to an actual echo. Thus, echo is canceled in the adder 5. As the above-mentioned echo path estimation algorithm, an adaptive filter technique, for example, a learning identification algorithm, which among many other adaptive algorithms, is comparatively small in computational complexity and good in convergence characteristic, is used. Details of the learning identification algorithm is disclosed, for example, in Institute of Electronics and Communication Engineers of Japan (IECE) Journal '77/11 Vol. J60-A NO.11, article under the heading of "Regarding Echo Canceling Characteristic of Echo Canceler Using Learning Identification Algorithm".

As conditions for enabling the above learning, the following requirements must be met.

① A far-end voice output Rout of the level sufficient for an echo to come back as a near-end voice input Sin is present. In other words, the far-end taker is currently engaged in speech.

② The near-end voice input Sin is constituted of an echo (or an echo and a white noise) alone. In other words, the near-end taker is not engaged in speech.

On the other hand, when the far-end talker is in a speechless condition and when the far-end talker and the near-end talker are simultaneously engaged in speech (this state is hereinafter referred to as the "double talk"), it is necessary to turn off the learning function because there is a fear to cause a mis-learning state of echo path estimation.

In the transmission line, digital signals are transmitted, and a D/A conversion (in a general expression, a $\mu$-LAW conversion) is made between the echo canceler 1 adapted to process such digital signals and the hybrid circuit 2 adapted to undertake a conversion to the analog line. For this reason, a non-linear characteristic relation is established between the far-end voice output Rout and the near-end voice input Sin. Therefore, echo cannot be canceled fully and completely merely through the linear computation by means of the echo path estimation/echo replica generation circuit 3, etc. As a consequence, an echo component unable to be completely canceled is produced.

In order to remove such an echo component (hereinafter referred to as the "residual echo"), the non-linear processor 6 is employed. This non-linear processor 6 undertakes a non-linear switching operation. Specifically, in the case where the near-end voice output Sout is constituted merely of an echo, in other words, in the case where only the far-end talker is currently engaged in speech (this state is hereinafter referred to as the "far-end talker's single talk"), a switching operation is made such that the transmission of the near-end voice output Sout is prohibited or an operation is made such that the near-end voice output Sout is replaced by a pseudo noise.

The control unit 4 controls the echo path estimation/echo replica generation circuit 3 and the non-linear processor 6. That is, the control unit 4 detects the far-end taker's speech-less condition or detects the double talk, controls the ON/OFF state of the learning function of the echo path estimation in accordance with a double talk signal DT, detects the far-end talker's single talk, and controls the switching operation of the non-linear processor 6.

Incidentally, in the above-mentioned techniques, there are encountered with the following problems.

① Firstly, since the above-mentioned techniques merely employ an adaptive filter technology such as the learning identification algorithm, if the delay time of an echo to be canceled is increased, the number of taps of the adaptive filter is increased and the computational complexity is also increased.

In other words, the echo path estimation/echo replica generation circuit 3 estimates an echo path presuming that the far-end voice input Rin and the near-end voice input Sin are time-wise coincident with each other, and generates an echo based on the estimated echo path. However, since the near-end voice input Sin from the hybrid circuit 2 is delayed, with respect to the far-end voice input Rin, by a delay time attributable to a transmission path between the echo canceler 1 and the hybrid circuit 2, the far-end voice input Rin is input first in the echo path estimation/echo replica generation circuit 3 and then, the near-end voice input Sin corresponding to Rin is input therein with the above-mentioned delay time. During this time, it becomes impossible to satisfactorily carry out a learning based on the estimation of an echo path.

② Also, in the above-mentioned conventional techniques, the echo canceler did not have any information of the echo path at the start of an operation. However, observation of the present inventors revealed that characteristic of an echo path is substantially controlled by characteristic of a hybrid. Specifically, the waveform of an echo determined by a hybrid was longitudinally shifted on the time axis in accordance with a delay in the transmission line and attenuated in accordance with the attenuation in the transmission line. As a result, a waveform of an echo in the transmission line with respect to an impulse input was obtained with a considerable accuracy.

③ A digital signal is transmitted in the transmission line and a D/A conversion (in general, μ-LAW conversion) is performed between the echo canceler 1 for processing the digital signal and the hybrid circuit 2 for performing a conversion to an analog line. For this reason, a linear relation is established between the far-end voice output Rout and the near-end voice input Sin. Therefore, it is impossible to fully and completely cancel the echo merely by linear operation using the echo path estimation/echo replica generation circuit 3, etc.

In order to improve the shortcomings of ① to ③ as a group, it is necessary to change the design of the echo canceler extensively or to modify it entirely. This being the case, it was unexpectable that the existing equipment is effectively used. Further, recently, there is a demand of a high-speed convergence with respect to an echo canceler.

DISCLOSURE OF INVENTION

The present invention has been accomplished in view of above-mentioned situation. It is, therefore, a first object of the invention to provide an echo canceler and an echo path estimating method capable of estimating an echo path rapidly and with a high accuracy.

A second object of the invention is to realize the first object without extensively altering the existing devices.

To achieve the above objects, according to the present invention, there is provided an echo canceler employed in a communication line network including a first transmission line for transmitting a voice of a four-wire side and a second transmission line for transmitting a voice of a second-wire side, the echo canceler comprising:

training signal generator means for generating a training signal and supplying the same to the first transmission line; and coefficient calculator means for calculating a coefficient necessary for generating an echo replica based on a correlation established between the training signal supplied to the first transmission line and a signal of the second transmission line.

Here, as one example of the training signal, there can be listed a pseudo noise or a filtered pseudo noise. The training signal is not particularly limited to one which is designed as a training signal, and a ring back tone or the like can be used for it.

In the case where a pseudo noise is selected as the training signal, a certain pseudo noise is supplied to a first transmission line for transmitting the far-end talker's voice and then a coefficient necessary for generating an echo replica is calculated based on a correlation established between the pseudo noise and a signal of a second transmission line. This correlation is established under the condition that the voice level of the far-end talker's can be almost neglected. The expression "such a condition that . . . can be almost neglected" used herein refers to the "time for calculating a correlation being long enough to sufficiently lower a correlation between a noise to be added and a voice on the four-wire side". In other words, a training for estimating an echo path, namely, a training for generating an echo replica can be performed irrespective of the far-end talker's voice.

It is more preferred here that the pseudo noise is subjected to filtering depending on the level or frequency characteristic of the near-end talker's voice, so that the characteristic may be varied. The reason is that even if a component of the pseudo noise is transmitted to the near-end talker through a hybrid circuit, no speech hindrance can be created. Further, since an echo replica is generated by adding a component of a pseudo noise, the component of the pseudo noise is eventually canceled and never transmitted to the far-end talker. Furthermore, if the voice signal corresponding to the voice on the four-wire side is delayed by a transmission delay occurred between the echo canceler and the hybrid circuit, the delayed first voice signal can be time-wise matched with the second voice signal corresponding to the voice on the two-wire side. Thus, there is almost no time for generating an echo replica only by the first voice signal. Since this specific improvement can be applied directly to the existing devices, the afore-mentioned entire modification, etc. of the echo canceler are not required.

Moreover, if the first and second voice signals are up-sampled, there can be obtained an echo replica with a high accuracy. Since this specific improvement can be applied directly to the existing devices, the entire modification, etc. of the echo canceler are not required.

Furthermore, if it is designed such that response characteristics or frequency characteristics of a plurality of hybrids are stored in a storage unit, one of the characteristics is selected based on the correlation between the transmission signal transmitted from the four-wire side to the two-wire side and the echo signal transmitted from the two-wire side to the four-wire side, and the various parameters are initialized based on the selected characteristic, the learning speed can be increased. Thus, this is more preferable.

BEST MODE FOR CARRYING OUT THE INVENTION
(FIRST EMBODIMENT)

Figure 3:
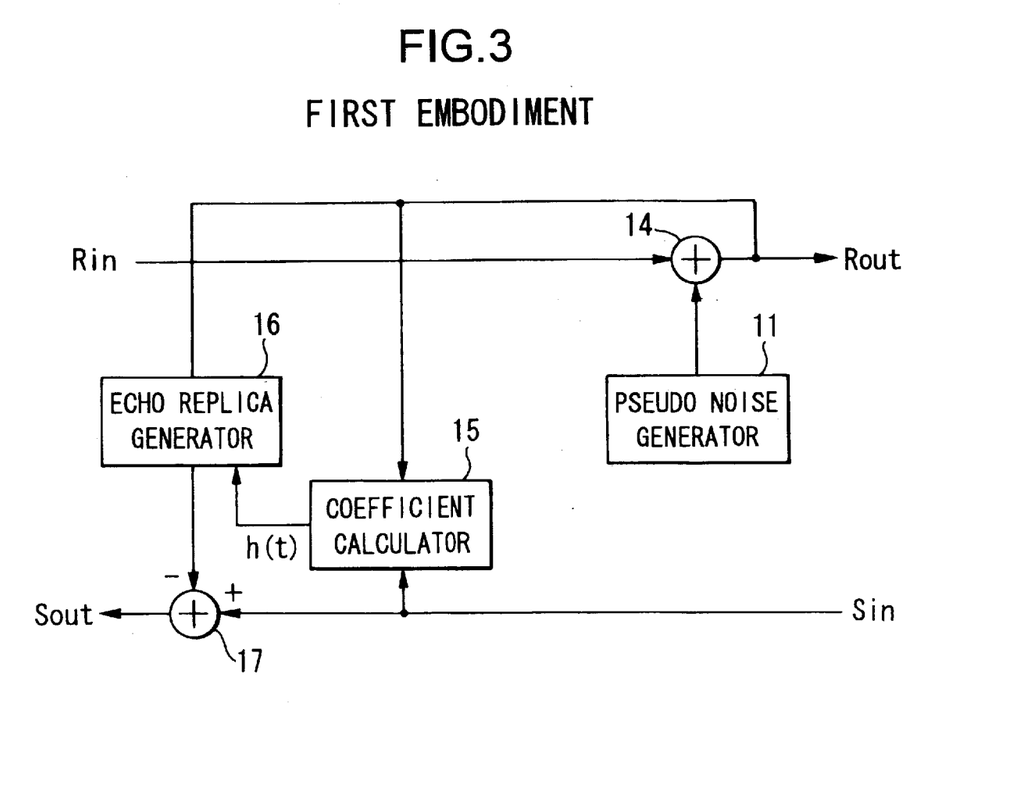
FIG. 3 is a block diagram showing an important portion of an echo canceler according to a first embodiment of the present invention.

FIG. 3 is a block diagram showing an important portion of an echo canceler according to the present invention. Here, a pseudo noise generator 11 generates a certain pseudo noise and outputs it. As this pseudo noise, a noise of a certain level (for example, white noise) is used. This pseudo noise is added to a far-end voice input Rin by an adder 14, and its result is output as a far-end voice output Rout. Therefore, a part of the pseudo noise is mixed with the near-end voice input Sin through the hybrid circuit 2 and supplied to a coefficient calculator 15.

The coefficient calculator 15 calculates a coefficient (for example, a tap coefficient such as a digital filter) necessary for generating an echo replica based on the far-end voice output Rout and the near-end voice input Sin. In that case, a correlation established under the condition that the far-end talker's voice is faint or the far-end talker is in a speechless condition as shown by the following equation (2).

$$S(t) = \int_0^\infty h(\tau) n(t - \tau) d\tau \tag{2}$$

In the above equation (2), t represents time and t=0 is time for starting a measurement. A pseudo noise to be added (or applied) to Rout is represented by n(t) and a signal to be obtained in Sin is represented by S(t). h(t) is an impulse response of an echo. Here, since n(t) is a noise which is close to white, a relation shown in the following equation (3) can be established with respect to a sufficiently large value $T_L$.

$$1/N \cdot \int_0^{T_L} n(\tau) n(t + \tau) d\tau = \delta(t) \tag{3}$$

Here, δ(t) is a delta function and becomes 1 in case of t=0, and 0 in other cases. N is set as shown by the following equation (4).

$$N = \int_0^{T_L} n^2(\tau) d\tau \tag{4}$$

If the relation of the above equation (3) is used, ha(t), this being an estimated value of h(t), can be developed in a way as shown by the following equation (5).

$$\begin{aligned} ha(t) &= 1/N \cdot \int_0^{T_L} n(\tau) S(t + \tau) d\tau \\ &= 1/N \cdot \int_0^{T_L} n(\tau) \cdot \int_0^\infty h(\tau') n(t + \tau - \tau') d\tau' d\tau \\ &= \int_0^\infty h(\tau') \cdot 1/N \int_0^{T_L} n(\tau) n(t - \tau' + \tau) d\tau d\tau' \end{aligned} \tag{5}$$

In the above equation (5), a portion shown by the following equation (6) becomes 1 in case of t=τ', and 0 in other cases.

$$1/N \int_0^{T_L} n(\tau) n(t - \tau' + \tau) d\tau = \delta(t - \tau') \tag{6}$$

Therefore, the equation (5) can be approximated as shown by the equation (7). Eventually, the estimated value ha(t) becomes generally equal to h(t).

$$ha(t) \approx \int_0^\infty h(\tau') \delta(t - \tau') d\tau' = h(t) \tag{7}$$

It should be noted that the above h(t) is an impulse response of an echo and therefore, equal to the coefficient for generating an echo replica. This can be derived from the correlation shown by the above equation (2) as previously mentioned. The coefficient calculator 15 calculates this coefficient h(t) by means of the above-mentioned calculation procedure and outputs the same to an echo replica generator 16. This echo replica generator 16 generates an echo replica based on this coefficient. The details will now be described. Firstly, it is designed such that the echo replica generator 16, as in the case with a known adaptive filter, outputs an echo replica ya, based on the following equation (8).

$$ya = ha^t x \tag{8}$$

where ha=$(h_1, h_2, \ldots, h_n)^t$, ($^t$ is a transposition of a vector) x=$(x_{k-1}, x_{k-2}, \ldots, x_{k-n})^t$, $x_j$=x(jT), (T is a sampling interval, and x(hT) is a sampling result of the far-end voice signal Rout at time jT)

In this embodiment, the coefficients $h_1, h_2, \ldots, h_n$ are set to h(T), h(2T), . . . , h(nT), respectively. Accordingly, an echo component contained in the near-end voice input Sin is canceled by an adder 17. Since such an echo replica is generated by, as previously mentioned, adding a pseudo noise which is mixed with the far-end voice output Rout, it can be canceled even in the event that the component of the pseudo noise is mixed with the near-end voice input Sin. As a consequence, it can be avoided that the component of the pseudo noise is transmitted to the far-end talker. Therefore, a speech hindrance occurrable to t he far-end talker by the admixture of the pseudo noise is occurred. If a noise should be somehow transmitted to the near-end talker or far-end talker by the admixture of the pseudo noise, a possible speech hindrance would be avoided by appropriately adjusting the level of the specific pseudo noise, etc.

(SECOND EMBODIMENT)

Figure 4:
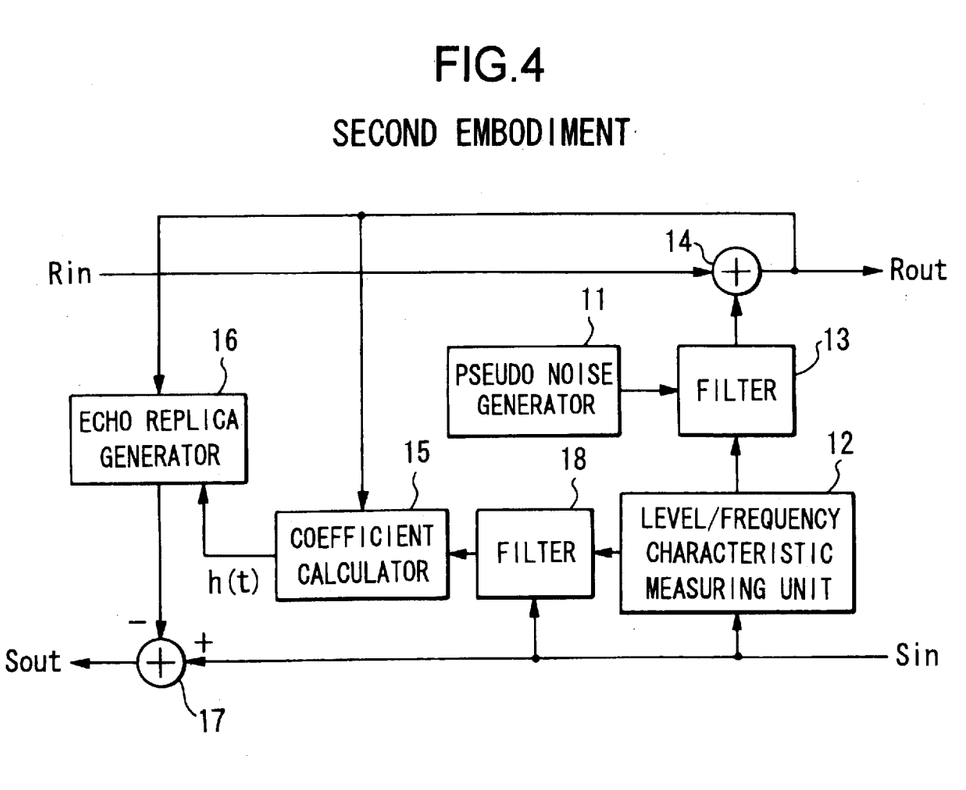
FIG. 4 is a block diagram showing an important portion of an echo canceler according to a second embodiment of the present invention.

FIG. 4 is a block diagram showing an important portion of an echo canceler according to a second embodiment of the present invention. In this embodiment, a pseudo noise generator 11, as in the case with the comparable one of the first embodiment, generates a certain pseudo noise and outputs it. On the other hand, a level/frequency characteristic measuring unit 12 measures the level and frequency characteristic of a signal of the near-end voice input Sin. Depending on a result of this measurement, characteristics of filters 13 and 18 are varied.

Figure 5A:
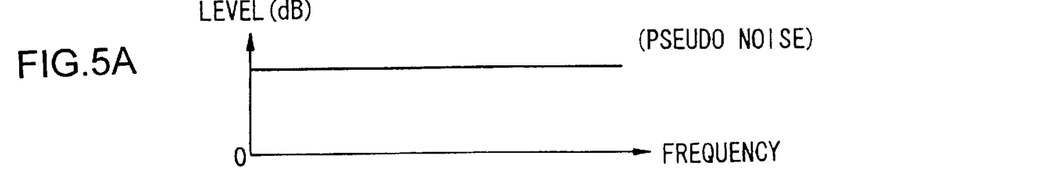
FIG. 5A, 5B, and 5C are graphs showing frequency characteristics of a filter.
Figure 5B:
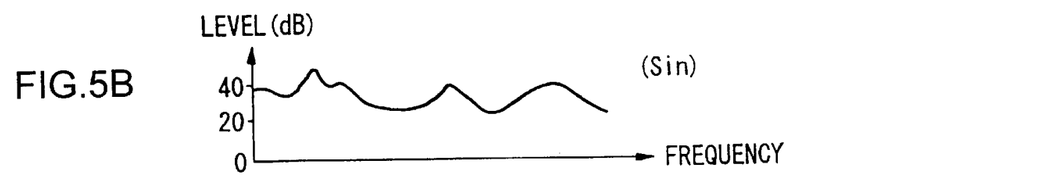
Figure 5C:
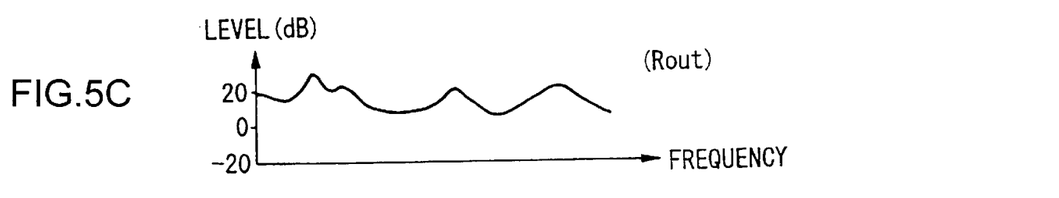

FIG. 5(a) shows a frequency characteristic of the above pseudo noise. As shown in this illustration, a pseudo noise having a flat characteristic is employed. FIG. 5(b) shows a frequency characteristic of the near-end voice input Sin corresponding to the near-end talker's voice measured by the level/frequency characteristic measuring unit 12. The characteristic of the filter 13 is varied as shown in FIG. 5(c) in accordance with the measured frequency characteristic. In this embodiment, the filter characteristic is variably set such that the frequency of the near-end talker's voice is simulated and the difference in level is fixed (in the illustrated example, 20dB). The filter 18 is set such that it has an inverse characteristic with respect to that of the filter 13. With this feature, if the filters 13 and 18 are cascaded to each other, input and output signals of the cascaded circuit become equal to each other.

The filter 13 renders the variable filter characteristic thus set to pseudo noise and then outputs the noise. Consequently, frequency characteristic of the pseudo noise is varied in accordance with the near-end talker's voice. Since the characteristic of the pseudo noise, when output, will come to correspond to the near-end talker's voice, any adverse effects to the near-end talker caused by the pseudo noise can be avoided even if such a pseudo noise is admixed with the far-end talker's voice output Rout and transmitted to the near-end talker through the hybrid circuit 2. The reason is that owing to the feature of the auditory sense, man hardly has a sense of physical disorder with respect to a signal whose frequency characteristic is approximated, and a possible deterioration in quality occurrable to a speech can be prevented from the viewpoint of man's physical sense of feel.

Also, it is set such that the higher the level of the far-end talker's voice becomes, the higher the gain of the filter 18 becomes. This arrangement is also for the same reason as mentioned above. Namely, when the talk level is high, the noise can be hardly recognized by man even if the noise level is comparatively high.

An output from the filter 13 is supplied to the transmission line for transmitting the far-end talker's voice through the adder 14 and served as the afore-mentioned far-end voice output Rout. Therefore, the output from the filter 13 is partly admixed with the near-end voice input Sin through the hybrid circuit 2 and then supplied to the filter 18. Since the filter 18 has an inverse characteristic with respect to that of the filter 13, an output from the filter 18 becomes similar to a signal obtainable when a pseudo noise output from the pseudo noise generator 11 is supplied directly to the hybrid circuit 2. Next, the coefficient calculator 15 calculates a coefficient (for example, a tap coefficient of a digital filter or the like) necessary for generating an echo replica based on the far-end voice output Rout and near-end voice input Sin. This principle will now be described in detail. Firstly, if a noise is represented by N(f) with respect to a frequency f; characteristic of the filter 11, by G(f); characteristic of the filter 18, by $G^{-1}(f)$; and characteristic of an echo, by H(f), respectively, frequency characteristic S(f) of the near-end voice signal Sin can be given by the following equation (9).

$$S(f)=H(f)G(f)N(f) \tag{9}$$

Nextly, an output signal S'(f) of the filter 18 is given by the following equation (10).

$$\begin{aligned} S'(f) &= G^{-1}(f)S(f) \\ &= G^{-1}(f)S(f) \\ &= G^{-1}(f)H(f)G(f)N(f) \\ &= H(f)N(f) \end{aligned} \tag{10}$$

A correlation computation output between this and N (f) can be expressed by the following equation (11).

$$\begin{aligned} Ha(f) &= S'(f)N^*(f) \\ &= H(f)N(f)N^*(f) \end{aligned} \tag{11}$$

In the above equation, since N (f) is a noise close to white, the following equation (12) is approximately established.

$$N(f)N(f) \approx 1 \tag{12}$$

Therefore, the following equation (13) is established and an impulse response of an echo can be approximately obtained.

$$Ha(f) \approx H(f) \tag{13}$$

Therefore, in a time area, an impulse response of an echo, namely, a coefficient for generating an echo replica can be obtained from a correlation computation (the under-listed equation (14)) between an output S (t) of the filter 18 and an output n (t) of the noise generator 11.

$$ha(t) = 1/N \cdot \int_0^{T_L} S'(\tau)n(t-\tau)d\tau \tag{14}$$

where $$N = \int_0^{T_L} n^2(\tau)d\tau$$

The echo replica generator 16, as in the case with the known adaptive filter, outputs an echo replica ya based on the following equation (15) (as in the case with the equation (7) of the first embodiment).

$$ya=ha^t x \tag{15}$$

where $ha=(h_1, h_2, \ldots, h_n)^t$
$x=(x_{k-1}, x_{k-2}, \ldots, x_{k-n})^t$, $x_j=x(jT)$ In this embodiment, the coefficients $h_1, h_2, \ldots, h_n$, are set to ha (T), ha (2T), ..., ha (nT), respectively. Therefore, the echo component contained in the near-end voice input Sin is canceled by the adder 17. Such an echo replica, as mentioned above, is generated by adding a pseudo noise which is admixed with the far-end voice output Rout. Therefore, even if the component of the specific pseudo noise is admixed with the near-end voice input Sin, the noise can be canceled. Eventually, it can be avoided that the component of the pseudo noise is transmitted to the far-end talker. Therefore, a speech hindrance occurrable to the far-end talker by the admixture of the pseudo noise is not occurred. If a noise should be somehow transmitted to the near-end talker or far-end talker by the admixture of the pseudo noise, such a possible speech hindrance would be avoided by appropriately adjusting the level of the specific pseudo noise, etc.

As mentioned above, according to this embodiment, the pseudo noise, whose frequency characteristic is variable in accordance with the near-end talker's voice, is forcibly supplied to the transmission line for transmitting the far-end talker's voice, and an echo path is estimated and an echo replica is generated by using the specific pseudo noise. Accordingly, a training for estimating an echo path can be carried out irrespective of the far-end talker's voice. Thus, by transfiguring the noise in accordance with the level/frequency of the near-end voice, an appropriate echo replica can be generated while minimizing a possible deterioration of speech quality of the near-end talker.

(THIRD EMBODIMENT)

A third embodiment of the present invention will now be described. In this embodiment, the far-end voice input Rin and the near-end voice input Sin are time-wise matched, so that accuracy of cancellation characteristic of the echo canceler is improved.

Figure 6:
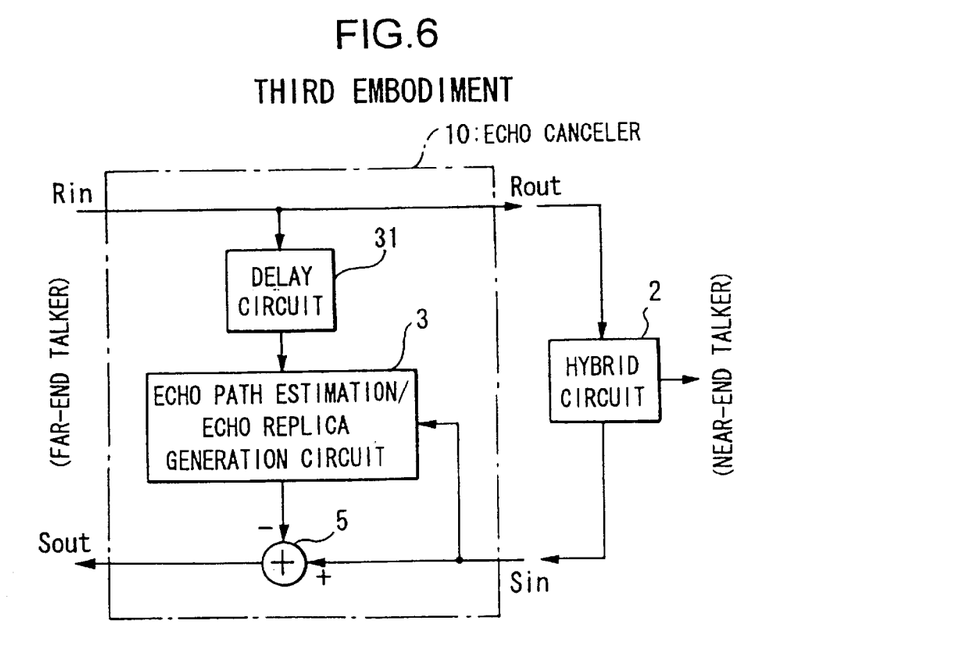
FIG. 6 is a block diagram showing an important portion of an echo canceler according to a third embodiment of the present invention.

FIG. 6 is a block diagram showing a construction of the third embodiment. An echo canceler 10 shown in this illustration is different from the conventional echo canceler 1 shown in FIG. 1 in the respect that a delay circuit 31 for delaying the far-end voice input Rin is located on a front stage of an echo path estimation/echo replica generation circuit 3. A delay time in this delay circuit 31 is generally equal to a transmission delay occurrable between an echo canceler 10 and a hybrid circuit 2.

Next, effects of the above construction will be described. As mentioned above, in the prior art having no delay circuit 31, the near-end voice input Sin from the hybrid circuit 2 is delayed in response by the above-mentioned delay time with respect to the far-end voice input Rin. Accordingly, the far-end voice input Rin is input first in the echo path estimation/echo replica generation circuit 3 and then the corresponding near-end voice input Sin is input therein with the above-mentioned delayed time. For this reason, if the delay time corresponds to the calculating time of, for example, 200 taps of the FIR filter, it is only 312 taps among so many taps as 512 that can be substantially contributed to the estimation of an echo path and/or generation of an echo replica in the procedure of an echo path estimation/echo replica generation.

In contrast, in this embodiment, since the delay time with respect to the hybrid circuit 2 is given to the far-end voice input Rin so that the far-end voice input Rin is time-wise matched with the near-end voice input Sin, the performance of the FIR filter can be fully extracted and an echo replica can be generated with a higher accuracy. Thus, accuracy of the cancellation characteristic of the echo canceler can be improved. Moreover, since the existing devices can be directly used in this embodiment, the afore-mentioned entire modification, etc., are no more required.

(FOURTH EMBODIMENT)

A fourth embodiment of the present invention will now be described. In this embodiment, the far-end voice input Rin and the near-end voice input Sin are so-called over-sampled in order to improve accuracy of the cancellation characteristic of the echo canceler.

Figure 7:
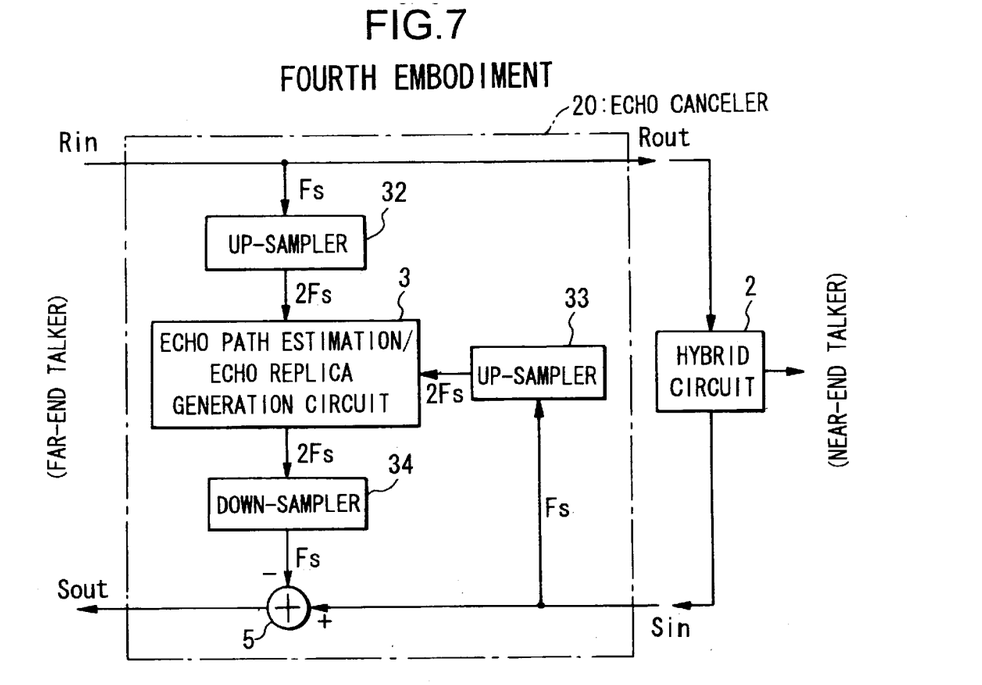
FIG. 7 is a block diagram showing an important portion of an echo canceler according to a fourth embodiment of the present invention.

FIG. 7 is a block diagram showing a construction of the fourth embodiment. An echo canceler 20 shown in this illustration is different from the echo canceler 1 shown in FIG. 1 in the respect that an up-sampler 32 for up-sampling the far-end voice input Rin and another up-sampler 33 for up-sampling the near-end voice input Sin are located at a front stage of an echo path estimation/echo replica generation circuit 3, and a down-sampler 34 for down-sampling an echo replica is located at a rear stage of the echo path estimation/echo replica generation circuit 3.

Here, if, for example, the sampling frequency of the far-end voice input Rin and near-end voice input Sin is 8 k Hz (=Fs), the sampling frequency of the up-samplers 32, 33 is 16 k Hz of 2 Fs. Similarly, the sampling frequency by the down-sampler 34 is 8 k Hz of Fs.

Next, effects of the above-mentioned construction will be described. With such a construction as mentioned above, the estimation of an echo path and/or generation of an echo replica are performed at the same 2 Fs as the up-samplers 32, 33. Since this echo is generated by convolutional operation between an echo path estimated based on the up-sampled far-end voice input Rin and near-end voice input Sin and the up-sampled far-end voice input Rin, its accuracy is higher than the conventional echo canceler. As a consequence, accuracy of the cancellation characteristic of the echo canceler can be improved. Furthermore, there is such an advantage that the speed of convergence becomes faster as the sampling rate is increased. In addition, since the echo canceler of this embodiment, as in the case with the third embodiment, can use the existing devices as they are, the afore-mentioned entire modification, etc. are no more required.

(FIFTH EMBODIMENT)

A. Construction of the Embodiment

Figure 9:
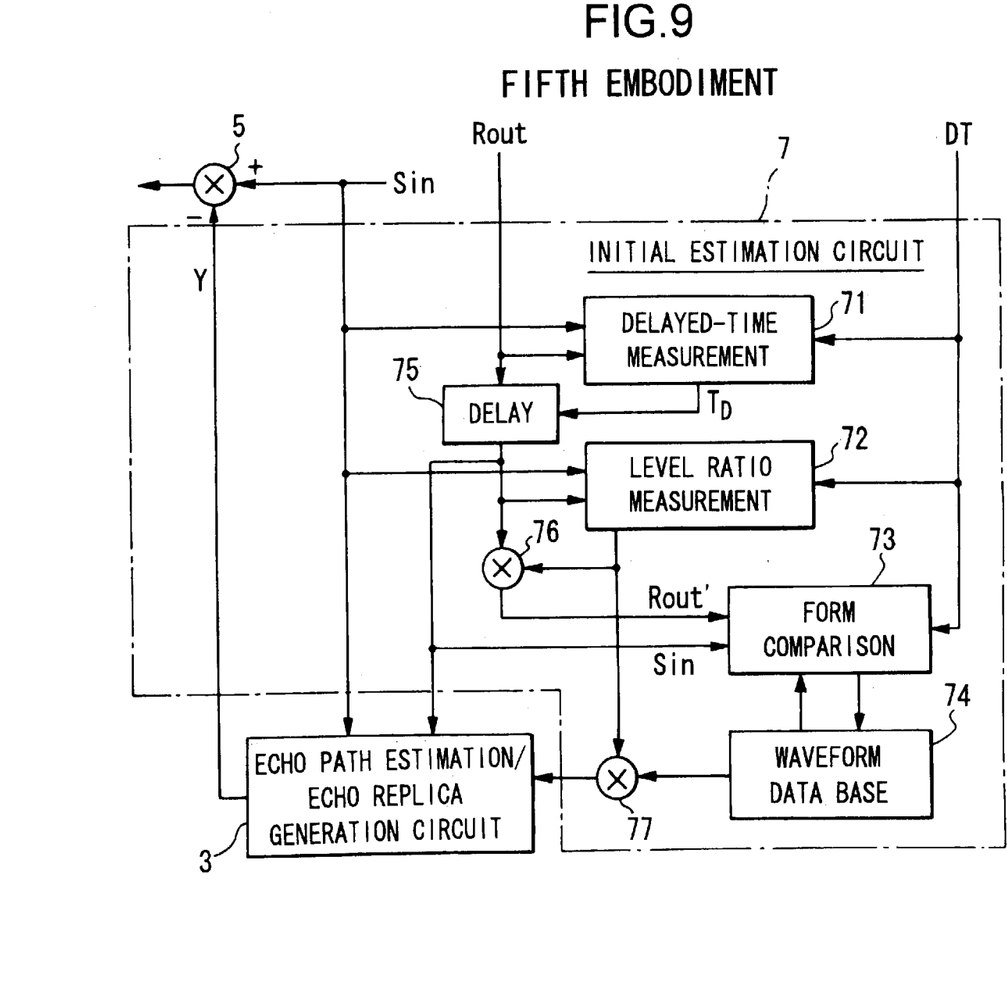
FIG. 9 is a block diagram showing an important portion of an echo canceler according to a fifth embodiment of the present invention.

FIG. 9 is a block diagram of an important portion of an echo canceler according to a fifth embodiment of the present invention. In this device, an initial estimation circuit 7 is employed in addition to the echo canceler of FIG. 1. A portion which is not illustrated is constructed in the same way as FIG. 1.

In FIG. 9, reference numeral 71 denotes a delay time measuring circuit. The delay time measuring circuit 71 obtains a delay time $T_D$ (see FIG. 2) based on the near-end voice input Sin and the far-end voice output Rout and outputs its result. As means for obtaining the delay time $T_D$, for example, a difference between the time when a peak of the near-end voice input Sin is generated and the time when a peak of the far-end voice output Rout is generated, both in a predetermined period may be obtained, or a mutual correlation between the two signals may be obtained.

Reference numeral 75 denotes a delay circuit. This delay circuit 75 delays the far-end voice output Rout by the delay time $T_D$ which is output from the delay time measuring circuit 71. Reference numeral 72 denotes a level ratio measuring circuit. This level ratio measuring circuit 72 compares a level between the near-end voice input Sin and the far-end voice output Rout and supplies a signal corresponding to the ratio to one end of a multiplier 76. Also, the delayed far-end voice output Rout is supplied to another end of the multiplier 76. Accordingly, a far-end voice output Rout, which is normalized in delay time and level (this output is hereinafter referred to as "the signal Rout'"), is output from the multiplier 76.

Reference numeral 74 denotes a waveform data base. This waveform data base 74 stores characteristic data of echo waveforms for various kinds of hybrids. The terms "characteristic data" used herein refers to the tap coefficient $b_i$ (see the equation (1)) in the FIR filter of the echo path estimation/echo replica generation circuit 3. It should be noted that there are about dozens kinds of hybrids which are currently used in a telephone line and it is not a difficult job to store the characteristic data for all kinds of hybrids. Reference numeral 73 denotes a configuration comparator. This configuration comparator 73 selects one of the characteristic data, which is most resemble the actual correlation, based on the correlation between the signal Rout' and the near-end voice input Sin. The selected characteristic data (tap coefficient $b_i$) is set to an initial value of the tap coefficient of the FIR filter of the echo path estimation/echo replica generation circuit 3.

The far-end voice output Rout, which was delayed by the delay circuit 75, is supplied also to the echo path estimation/ echo replica generation circuit 3. Thus, in the echo path estimation/echo replica generation circuit 3, no delay time $T_D$ (see FIG. 2) exists between the near-end voice input Sin and the far-end voice output Rout. It should be noted that the delay time measuring circuit 71, level ratio measuring circuit 72 and configuration comparator 73 are all stopped in operation when a double talk is detected in the control unit 4 (i.e., when the double talk signal DT is output).

B. Operation of the Embodiment

Next, operation of this embodiment will be described.

Firstly, when the far-end talker issues some voice, its content is supplied to the delay time measuring circuit 71 in the form of the far-end voice output Rout. When the near-end voice input Sin, as an echo based on it, is supplied to the delay time measuring circuit 71 before long, the delay time $T_D$ is calculated in the delay time measuring circuit 71 and its value is supplied to the delay circuit 75 and the echo path estimation/echo replica generation circuit 3.

As a consequence, the far-end voice output Rout, which is now delayed by $T_D$, is supplied to the level ratio measuring circuit 72. The level ratio measuring circuit 72, in turn, supplies a signal corresponding to a ratio of level between the near-end voice input Sin and the far-end voice output Rout to one end of the multiplier 76. By doing this, the signal Rout', which is now normalized in delay time and level, is supplied to the configuration comparator 73.

In the configuration comparator 73, one of the characteristic data stored in the waveform data base 74, which is most resemble the actual correlation, is selected based on the correlation between the signal Rout' and the near-end voice input Sin. The selected characteristic data is corrected its level by the multiplier 77 and is then supplied to the echo path estimation/echo replica generation circuit 3. By this procedure, an initial value of the tap coefficient of the FIR filter is set. The far-end voice output Rout, which is now delayed by $T_D$, is further supplied to the echo path estimation/echo replica generation circuit 3 through the delay circuit 75.

At the time point when the setting of the delay time $T_D$ with respect to the delay circuit 75 and the setting of an initial value of the tap coefficient $b_i$ with respect to the FIR filter are all finished in the way as just mentioned, the operation of the initial estimation circuit 7 is finished. Thereafter, in the echo path estimation/echo replica generation circuit 3, a learning identification i s made based on the near-end voice input Sin and the far-end voice output Rout, and the tap coefficient $b_i$ is appropriately changed in order to estimate a more correct echo path. In this way, according to the present invention, the delay time of the delay circuit 75 can be set by the delay time measuring circuit 71 and an initial value of the tap coefficient $b_i$ in the echo path estimation/echo replica generation circuit 3 can be set by the configuration comparator 73 and the waveform data base 74.

Of course, the estimation of an echo path is not finished by those initial values and a further learning is required in the echo path estimation/echo replica generation circuit 3. However, with the above-mentioned arrangement, the time required for converging the result of learning can be remarkably shortened by rendering the initial values having a somewhat satisfactory degree of correctness to the echo path estimation/echo replica generation circuit 3. Moreover, according to the present invention, since the far-end voice output Rout, which is now delayed by $T_D$, is supplied to the echo path estimation/echo replica generation circuit 3 through the delay circuit 75, load of the learning in the echo path estimation/echo replica generation circuit 3 can be reduced and an echo path estimation can be performed at a higher speed and with a higher accuracy.

As described in the foregoing, according to the echo canceler of this embodiment, since the delay time at the time when an echo replica is generated is pre-set or a comparatively more accurate initial value of each parameter can be set, an echo path estimation can be performed at a high speed and with a high accuracy.

(SIXTH EMBODIMENT)

A. Construction of the Embodiment

Figure 10:
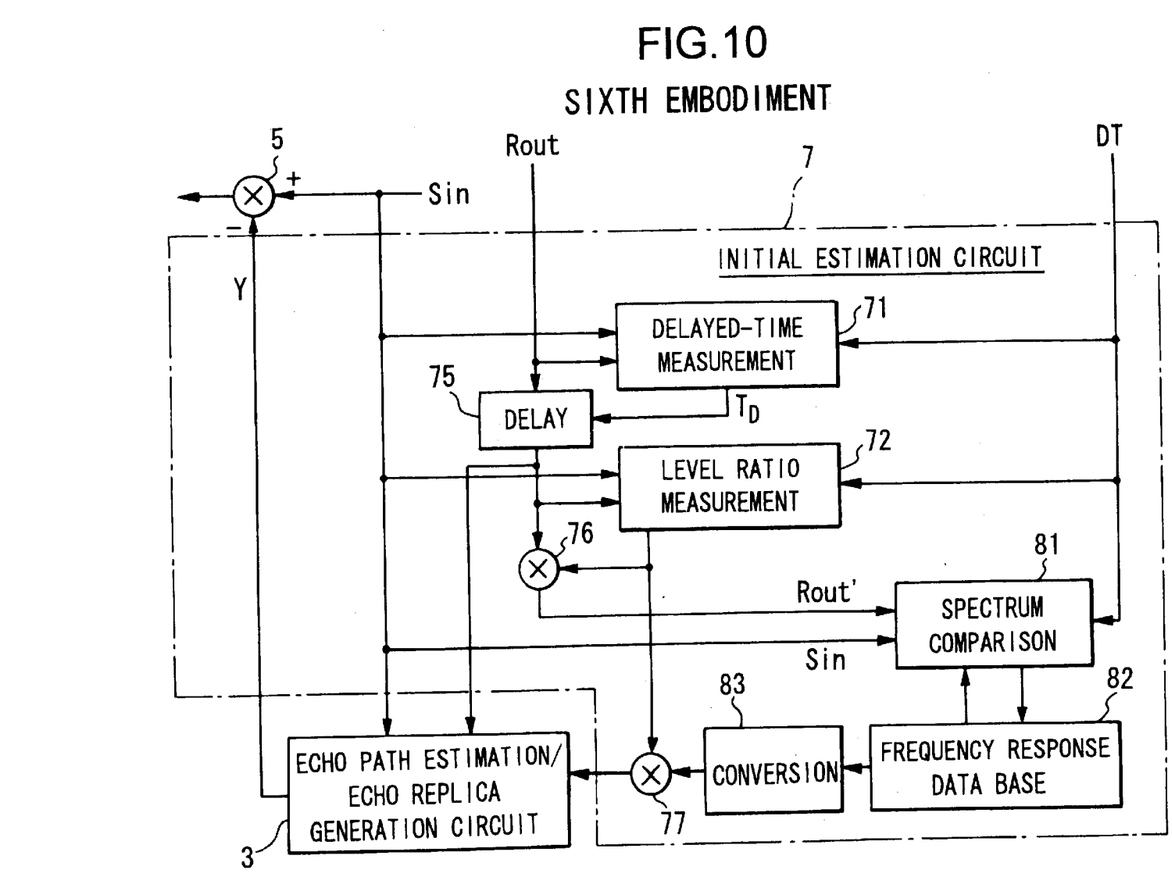
FIG. 10 is a block diagram showing an important portion of an echo canceler according to a sixth embodiment of the present invention.

FIG. 10 is a block diagram of an important portion of an echo canceler according to one embodiment of the present invention. In this embodiment, a spectrum comparator 81 and a frequency response data base 81 are employed in the place of the configuration comparator 73 and the waveform data base 74 of the fifth embodiment.

The frequency response data base 81 stores data of frequency response characteristics of various kinds of hybrids. Since there are only about dozens kinds of hybrids which are currently used in a telephone line as previously mentioned, it is not a difficult job to store data of the frequency response characteristics of all kinds of hybrids. The spectrum comparator 81 selects one of the frequency response characteristics, which is most resemble the actual characteristic, based on the correlation between the signal Rout' and the near-end voice input Sin. A convertor 83 converts the selected frequency response characteristic to a response characteristic on a time axis. Specifically, the frequency response characteristics are converted to the tap coefficients $b_i$ and those tap coefficients $b_i$ are set to initial values of the tap coefficients of the FIR filer of the echo path estimation/echo replica generation circuit 3. The spectrum comparator 81 is, as in the case with the configuration comparator 73 of the fifth embodiment, stopped in operation when a double talk is detected (i.e., when a double talk signal DT is output) in the control unit 4.

B. Operation of the Embodiment

Next, operation of this embodiment will be described.

Firstly, when the far-end talker issues some voice, its content is supplied to the delay time measuring circuit 71 in the form of the far-end voice output Rout. When the near-end voice input Sin, as an echo based on it, is supplied to the delay time measuring circuit 71 before long, the delay time $T_D$ is calculated in the delay time measuring circuit 71 and its value is supplied to the delay circuit 75 and the echo path estimation/echo replica generation circuit 3.

As a consequence, the far-end voice output Rout, which is now delayed by $T_D$, is supplied to the level ratio measuring circuit 72. The level ratio measuring circuit 72, in turn, supplied a signal corresponding to a ratio of level between the near-end voice input Sin and the far-end voice output Rout to one end of the multiplier 76. By doing this, the signal Rout', which is now normalized in delay time and level, is supplied to the spectrum comparator 81.

In the spectrum comparator 81, one of the characteristic data stored in the frequency response data base 82, which is most resemble the actual characteristic, is selected based on the correlation between the signal Rout' and the near-end voice input Sin. The selected characteristic is converted to the tap coefficient $b_i$ through the convertor 83, then corrected its level by the multiplier 77 and then supplied to the echo path estimation/echo replica generation circuit 3. By this procedure, an initial value of the tap coefficient of the FIR filter is set.

At the time point when the setting of the delay time $T_D$ with respect to the delay circuit 75 and the setting of an initial value of the tap coefficient $b_i$ with respect to the FIR filter are all finished in the way as just mentioned, the operation of the initial estimation circuit 7 is finished. Thereafter, in the echo path estimation/echo replica generation circuit 3, a learning identification is made based on the near-end voice input Sin and the far-end voice output Rout, and the tap coefficient $b_i$ is appropriately changed in order to estimate a more correct echo path. In this way, according to this embodiment, the delay time of the delay circuit 75 can be set by the delay time measuring circuit 71 and an initial value of the tap coefficient $b_i$ can be set by the delay time measuring circuit 71, frequency response data base 81 and convertor 83.

As described above, according to this embodiment, the time required for converging the result of learning can be remarkably shortened as in the case with the fifth embodiment by rendering the initial values having a somewhat satisfactory degree of correctness to the echo path estimation/echo replica generation circuit 3.

(MODIFIED EMBODIMENT)

It should be noted that the present invention is not limited to the above-mentioned embodiments. For example, many changes and modifications can be made as follows.

① In any of the above-mentioned embodiments, the present invention is applied to a signal transmission between a mobile telephone and a terrestrial telephone. However, application of the present invention is not limited to this. The present invention can be applied to all communication networks in which a signal transmission is made between a two-wire circuit and a four-wire circuit.

② In the first and second embodiments, the pseudo noise generator 11 normally generates a pseudo noise. However, an arrangement may also be made, in which a call boundary is received from the switch and no pseudo signal is generated until after the passage of a certain time. Owing to this arrangement, the learning can be finished by the time the near-end talker brings the receiver very close to the ear, so that a pseudo noise can be prevented from being transmitted to the near-end talker at the time a speech is actually made.

③ The pseudo noise generator 11 may generate a pseudo noise when the far-end talker remains in a speechless condition for more than a predetermined time. The reason is that when the far-end talker side is in a speechless condition, transmission of a noise, if any, to the near-end talker side cannot be any hindrance to the speech.

④ The pseudo noise generator 11 may generate a pseudo noise when a cancellation of echo has gone below a predetermined level in the adder 17. The reason is that there is a high possibility of no generation of normal echo replica in the echo replica generator 16 and a re-learning seems to be desirable.

⑤ The level of a pseudo noise is constant in the first embodiment. However, the level of a pseudo noise may be decreased as the time required for carrying out the correlation operation is increased.

Figure 8:
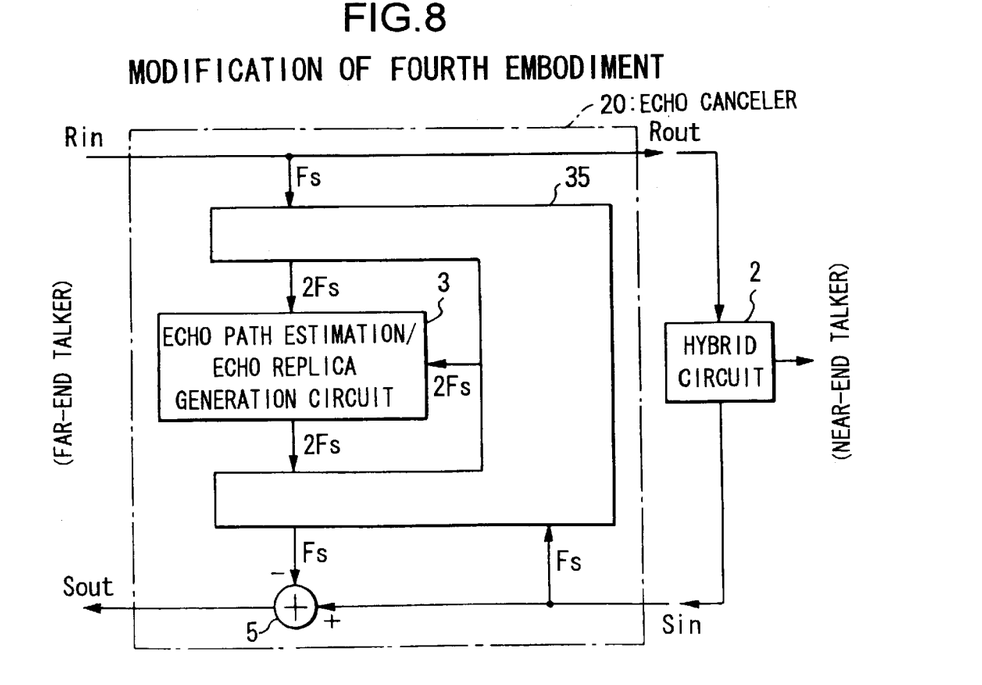
FIG. 8 is a block diagram showing an important portion of an echo canceler according to a modification of the fourth embodiment.

⑥ In the fourth embodiment, the up-samplers 32, 33 and the down-sampler 34 are constituted of separate elements. In the alternative, they may be constituted of a single element by a digital signal processor (DSP) 35 as shown in FIG. 8. In that case, since it is good enough that the DSP 35 is provided to the conventional construction and a clock to the echo path estimation/echo replica generation circuit 3 is changed to 2 Fs, accuracy of the cancellation characteristic of the echo canceler can be improved by slightly changing the design of the circuit alone.

In other words, since it is good enough that the sampling rate of the input/output signals to the estimation means and the echo replica generator is converted by means of a single signal convertor, a change from the existing devices can be made more easily.

⑦ In the fourth embodiment, the order of the sampling procedure may be changed in accordance with necessity. Important things here are that the processing timing of the up-samplers 32, 33 and the down-sampler 34 must be time-wise coincident and the output from the down-sampler 34 must be time-wise continuous.

Figure 11:
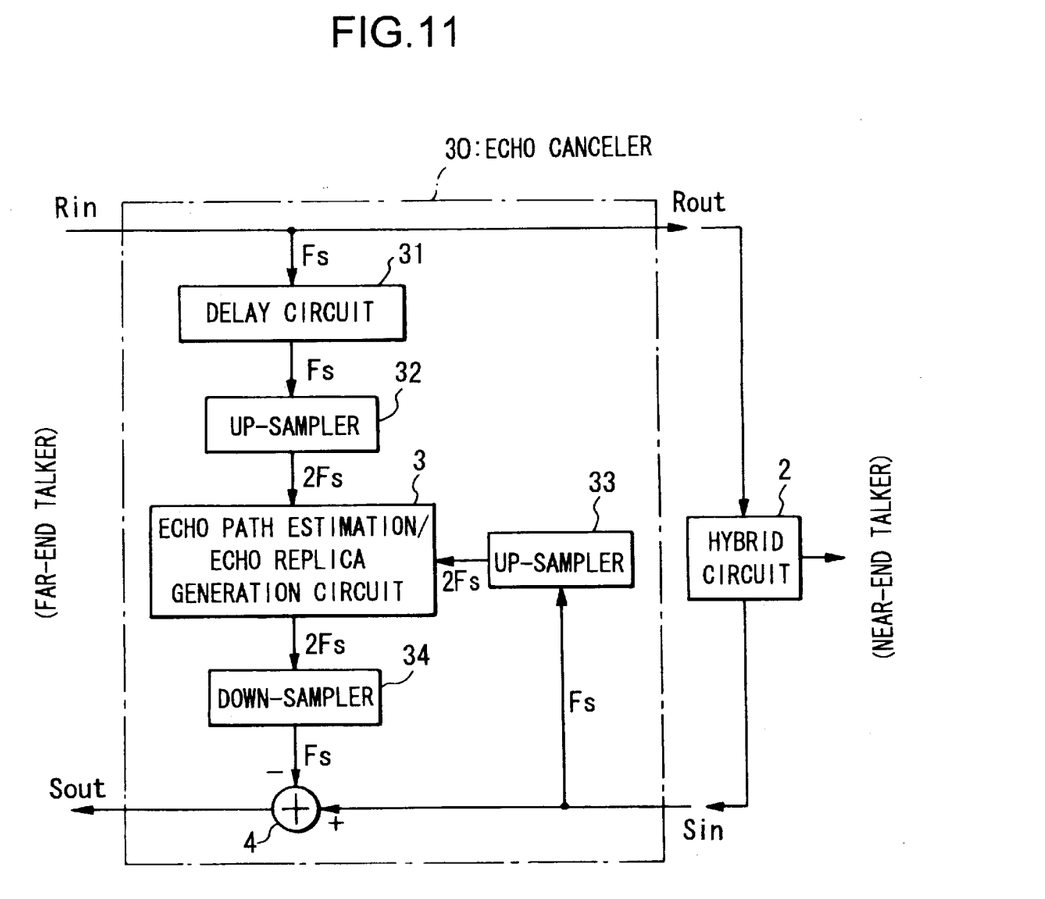
FIG. 11 is a block diagram showing an important portion of an echo canceler according to a modified embodiment consisting of a combination of the third embodiment and the fourth embodiment.

⑧ The above-mentioned third and fourth embodiments may be combined. FIG. 11 shows one example of a construction of an echo canceler 30 which is comprised of such a combination. As shown in this illustration, a delay circuit 31 is located at a front stage of the up-sampler 32. This delay circuit 31 is adapted to delay the far-end voice input Rin by a transmission delay occurrable between the echo canceler 30 and the hybrid circuit 2. According to this constitutional example, accuracy of the cancellation characteristic of the echo canceler can be more improved by the multiplier effect of the third and fourth embodiments.

⑨ In the fifth embodiment, the waveform data base 74 stores the tap coefficient $b_i$ as the characteristic data. However, the characteristic data is not limited to the tap coefficient $b_i$. For example, an alpha parameter, an LSP parameter, a per-call coefficient or the like, which can indicate the response characteristics of various kinds of hybrids, may be stored as the characteristic data.

⑩ In the fifth and sixth embodiments, the echo path estimation/echo replica generation circuit 3 is not limited to one which employs the learning identification algorithm. In the alternative, a wide range of algorithms such as Kalman filter and the like may be employed.

⑪ In the fifth and sixth embodiments, the echo path estimation/echo replica generation circuit 3 may be redesigned such that at first, the level of the echo replica is set to be smaller than the estimated value and it is gradually increased to the original level with the passage of time. The reason is that since it is difficult to estimate an echo replica correctly at the early stage, a high setting of the level of the echo replica signal Y rather results in such an inconvenience as a generation of a noise, etc.

⑫ In the third to sixth embodiments, an echo path is estimated based on a voice produced by the far-end talker. In the alternative, an echo path may be estimated using other signals. For example, in the case where a calling is issued from the near-end, an echo path may be estimated using a ring back tone, whereas in the case where a calling is issued from the far-end, an echo path may be estimated by transmitting a training signal to the hybrid immediately after the off-hook is made on the near-end side so that an echo path is estimated based thereon. The reason is that owing to the foregoing arrangement, when the near-end talker or the far-end talker actually starts a speech, an accurate echo path estimation is already obtained.

(13) In the fifth and sixth embodiments, the far-end voice output Rout, which has been delayed by the delay circuit 75, is supplied to the echo path estimation/echo replica generation circuit 3. In the alternative, a non-delayed far-end voice output Rout may be supplied to the echo path estimation/ echo replica generation circuit 3. In that case, the far-end voice output Rout may be delayed by the delay time $T_D$ measured in the delay time measuring circuit 71, within the echo path estimation/echo replica generation circuit 3 (specifically, in a numerical FIG. 1, a corresponding tap coefficient $b_i$ is brought to "0"). By doing this, even if the delay time $T_D$ is varied, the echo replica can be made obedient to the delayed time $T_D$ by means of a learning within the echo path estimation/echo replica generation circuit 3.

We claim:

1. An echo canceler employed in a communication line network including a first transmission line for transmitting a voice of a four-wire side and a second transmission line for transmitting a voice of a second-wire side, said echo canceler comprising:

training signal generator means for generating a training signal and supplying the same to said first transmission line;

coefficient calculator means for calculating a coefficient necessary for generating an echo replica based on a correlation established between the training signal supplied to said first transmission line and a signal of said second transmission line;

storage means for storing response characteristics of a plurality of hybrids;

selector means for selecting one of said response characteristics based on a relation between a transmission signal propagated from said four-wire side to said two-wire side and an echo signal propagated from said two-wire side to said four-wire side;

echo replica generator means for estimating an echo path by a predetermined learning algorithm and generating an echo replica by appropriately delaying the transmission signal and delaying the signal in accordance with a predetermined parameter; and initial parameter setting means for setting an initial value of said parameter based on the response characteristic selected by said selector means.

2. An echo canceler according to claim 1, further comprising:

delay time measuring means for measuring a delay time of the echo signal with respect to the transmission signal based on the transmission signal transmitted from said four-wire side to said two-wire side and the echo signal transmitted from said four-wire side to said two-wire side; and delay setting means for setting the delay time in said echo replica generator means to a delay time measured by said delay time measuring means.

3. An echo canceler employed in a communication line network for performing a transmission between a voice transmitted through a four-wire side and a voice transmitted through a two-wire side, said echo canceler comprising:

storage means for storing response characteristics of a plurality of hybrids;

selector means for selecting one of said response characteristics based on a relation between a transmission signal propagated from said four-wire side to said two-wire side and an echo signal propagated from said two-wire side to said four-wire side;

echo replica generator means for estimating an echo path by a predetermined learning algorithm and generating an echo replica by appropriately delaying the transmission signal and transfiguring the signal in accordance with a predetermined parameter; and initial parameter setting means for setting an initial value of said parameter based on the response characteristic selected by said selector means.

4. An echo path estimating method applicable to an echo canceler employed in a communication line network including a first transmission line for transmitting a voice of a four-wire side and a second transmission line for transmitting a voice of a second-wire side, said echo pass estimating method comprising:

a training signal output step for generating a training signal and supplying the same to said first transmission line;

a coefficient calculation step for calculating a coefficient necessary for generating an echo replica based on a correlation established between the training signal supplied to said first transmission line and a signal of said second transmission line;

storing response characteristics of a plurality of hybrids;

selecting one of said response characteristics based on a relation between a transmission signal propagated from said four-wire side to said two-wire side and an echo signal propagated from said two-wire side to said four-wire side;

estimating an echo path by a predetermined learning algorithm and generating an echo replica by appropriately delaying the transmission signal and transfiguring the signal in accordance with a predetermined parameter; and setting an initial value of said parameter based on the response characteristic selected by said selector means.

5. An echo path estimating method for estimating an echo path with respect to a communication line network for performing a transmission between a voice transmitted through a four-wire side and a voice transmitted through a two-wire side, said method comprising the steps of:

storing response characteristics of a plurality of hybrids;

selecting one of said response characteristics based on a relation between a transmission signal propagated from said four-wire side to said two-wire side and an echo signal propagated from said two-wire side to said four-wire side;

estimating an echo path by a predetermined learning algorithm and generating an echo replica by appropriately delaying the transmission signal and transfiguring the signal in accordance with a predetermined parameter; and setting an initial value of said parameter based on the response characteristic selected by said selector means.

6. An echo canceler employed in a communication line network including a first transmission line for transmitting a voice of a four-wire side and a second transmission line for transmitting a voice of a second-wire side, said echo canceler comprising:

training signal generator means for generating a training signal and supplying the same to said first transmission line;

coefficient calculator means for calculating a coefficient necessary for generating an echo replica based on a correlation established between the training signal supplied to said first transmission line and a signal of said second transmission line;

storage means for storing frequency characteristics of a plurality of hybrids;

selector means for selecting one of said frequency response characteristics based on a relation between a transmission signal propagated from said four-wire side to said two-wire side and an echo signal propagated from said two-wire side to said four-wire side;

echo replica generator means for estimating an echo path by a predetermined learning algorithm and generating an echo replica by appropriately delaying the transmission signal and transfiguring the signal in accordance with a predetermined parameter; and initial parameter set means for setting an initial value of said parameter based on the frequency response characteristic selected by said selector means.

7. An echo canceler according to claim 6, further comprising:

delay time measuring means for measuring a delay time of the echo signal with respect to the transmission signal based on the transmission signal transmitted from said four-wire side to said two-wire side and the echo signal transmitted from said two-wire side to said four-wire side; and delay setting means for setting a delay time in said echo replica generator means to a delay time measured by said delay time measuring means.

8. An echo canceler employed in a communication line network for performing a transmission between a voice transmitted through a four-wire side and a voice transmitted through a two-wire side, said echo canceler comprising:

storage means for storing frequency characteristics of a plurality of hybrids;

selector means for selecting one of said frequency response characteristics based on a relation between a transmission signal propagated from said four-wire side to said two-wire side and an echo signal propagated from said two-wire side to said four-wire side;

echo replica generator means for estimating an echo path by a predetermined learning algorithm and generating an echo replica by appropriately delaying the transmission signal and transfiguring the signal in accordance with a predetermined parameter; and initial parameter set means for setting an initial value of said parameter based on the frequency response characteristic selected by said selector means.

9. An echo path estimating method applicable to an echo canceler employed in a communication line network including a first transmission line for transmitting a voice of a four-wire side and a second transmission line for transmitting a voice of a second-wire side, said echo pass estimating method comprising:

a training signal output step for generating a training signal and supplying the same to said first transmission line;

a coefficient calculation step for calculating a coefficient necessary for generating an echo replica based on a correlation established between the training signal supplied to said first transmission line and a signal of said second transmission line;

storing frequency characteristics of a plurality of hybrids;

selecting one of said frequency response characteristics based on a relation between a transmission signal propagated from said four-wire side to said two-wire side and an echo signal propagated from said two-wire side to said four-wire side;

estimating an echo path by a predetermined learning algorithm and generating an echo replica by appropriately delaying the transmission signal and transfiguring the signal in accordance with a predetermined parameter; and setting an initial value of said parameter based on the frequency response characteristic selected by said selector means.

10. An echo path estimating method for estimating an echo path with respect to a communication line network for performing a transmission between a voice transmitted through a four-wire side and a voice transmitted through a two-wire side, said method comprising the steps of:

storing frequency response characteristics of a plurality of hybrids;

selecting one of said frequency response characteristics based on a relation between a transmission signal propagated from said four-wire side to said two-wire side and an echo signal propagated from said two-wire side to said four-wire side;

estimating an echo path by a predetermined learning algorithm and generating an echo replica by appropriately delaying the transmission signal and transfiguring the signal in accordance with a predetermined parameter; and setting an initial value of said parameter based on the frequency response characteristic selected by said selector means.

11. An echo canceler employed in a communication line network including a first transmission line for transmitting a voice of a four-wire side and a second transmission line for transmitting a voice of a second-wire side, said echo canceler comprising:

training signal generator means for generating a training signal and supplying the same to said first transmission line;

coefficient calculator means for calculating a coefficient necessary for generating an echo replica based on a correlation established between the training signal supplied to said first transmission line and a signal of said second transmission line;

first sampling means for up-sampling a first digital voice signal corresponding to the voice on said four-wire side;

second sampling means for up-sampling a second digital voice signal corresponding to the voice on said two-wire side at a same sampling rate as said first sampling means;

estimation means for estimating, on the basis of sampling results of the first and second up-sampler means, a response characteristic of a hybrid circuit for converting the four-wire side and the two-wire side;

echo replica generator means for artificially generating an echo caused by said hybrid circuit by means of calculation using the estimated result and the sampled result by said sampling means;

third sampling means for down-sampling an output signal of said echo replica generator means; and substraction means for subtracting an output signal of said third sampling means from said second digital voice signal.

12. An echo canceler according to claim 11, further comprising delay means located at a front stage of said estimation means and adapted to delay a predetermined time.

13. An echo canceler according to claim 11 or 12, wherein the up-sampling or down-sampling by said first to third sampling means is performed by a single signal convertor means, said signal convertor means converting a sampling rate of the input/output signal to said estimation means and said echo replica generator means.

14. An echo canceler employed in a communication line network for performing a transmission between a voice transmitted through a four-wire side and a voice transmitted through a two-wire side, said echo canceler comprising:

- first sampling means for up-sampling a first digital voice signal corresponding to the voice on said four-wire side;

- second sampling means for up-sampling a second digital voice signal corresponding to the voice on said two-wire side at a same sampling rate as said first sampling means;

- estimation means for estimating, on the basis of sampling results of the first and second up-sampler means, a response characteristic of a hybrid circuit for converting the four-wire side and the two-wire side;

- echo replica generator means for artificially generating an echo caused by said hybrid circuit by means of calculation using the estimated result and the sampled result by said sampling means;

- third sampling means for down-sampling an output signal of said echo replica generator means; and

- substraction means for subtracting an output signal of said third sampling means from said second digital voice signal.

* * * * *

UNITED STATES PATENT AND TRADEMARK OFFICE
CERTIFICATE OF CORRECTION

PATENT NO.     : 5,859,907
DATED          : January 12, 1999
INVENTOR(S)    : Toshiro Kawahara et al.

Page 1 of 1

It is certified that error appears in the above-identified patent and that said Letters Patent is hereby corrected as shown below:

<u>Title page</u>
<u>Column 1,</u>
After line 2, under "Foreign Application Priority Data", insert the following
-- May 7, 1994    [JP]    Japan    94 117590
   May 7, 1994    [JP]    Japan    94 117592
   May 7, 1994    [JP]    Japan    94 117593 --.

Signed and Sealed this

Eleventh Day of September, 2001

Attest:

*Attesting Officer*

NICHOLAS P. GODICI
*Acting Director of the United States Patent and Trademark Office*